(12) United States Patent
Fujiwake et al.

(10) Patent No.: US 11,063,301 B2
(45) Date of Patent: Jul. 13, 2021

(54) MANUFACTURING APPARATUS FOR ELECTRODE LAMINATE

(71) Applicant: Murata Manufacturing Co., Ltd., Nagaokakyo (JP)

(72) Inventors: Koichiro Fujiwake, Nagaokakyo (JP); Hideyasu Kamigawa, Nagaokakyo (JP); Takeshi Yamamoto, Nagaokakyo (JP); Sadao Nishida, Nagaokakyo (JP); Jiro Kamiura, Nagaokakyo (JP)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 195 days.

(21) Appl. No.: 16/395,744

(22) Filed: Apr. 26, 2019

(65) Prior Publication Data
US 2019/0252729 A1    Aug. 15, 2019

Related U.S. Application Data (63) Continuation of application No. PCT/JP2017/032340, filed on Sep. 7, 2017.

(30) Foreign Application Priority Data

Dec. 21, 2016 (JP) .............................. JP2016-247449

(51) Int. Cl.
*H01M 10/0585* (2010.01)
*H01M 10/42* (2006.01)
(Continued)

(52) U.S. Cl.
CPC ......... *H01M 10/0585* (2013.01); *B29C 65/74* (2013.01); *B29C 65/7435* (2013.01);
(Continued)

(58) Field of Classification Search
CPC .. B29C 65/74; B29C 65/7435; H01M 4/0435; H01M 4/88; H01M 8/1004;
(Continued)

(56) References Cited

U.S. PATENT DOCUMENTS

2015/0129107 A1*    5/2015    Miyazaki ............ B32B 38/1841
156/64

FOREIGN PATENT DOCUMENTS

JP    H09169456 A    6/1997
JP    H09221252 A    8/1997
(Continued)

OTHER PUBLICATIONS

International Search Report issued for PCT/JP2017/032340, dated Dec. 12, 2017.
(Continued)

*Primary Examiner* — George R Koch
(74) *Attorney, Agent, or Firm* — Arent Fox LLP (57) ABSTRACT

A manufacturing apparatus creates an electrode laminate in which an electrode is sandwiched between first and second separators. A first sensor detects a first lateral positional displacement amount in a width direction of the first separator with respect to a predetermined reference position. An electrode supply unit supplies the electrode to a predetermined electrode supply position. A second sensor detects a second lateral positional displacement amount in a width direction of the second separator with respect to a predetermined reference position. A control unit corrects a position of the first separator based on the first lateral positional displacement amount and corrects a position of the second separator based on the second lateral positional displacement amount. A camera detects an actual lateral positional displacement amount in the width direction of the first separator from a relationship with the position of the electrode by imaging, and the control unit corrects the predetermined reference position based on the actual lateral positional displacement amount.

4 Claims, 6 Drawing Sheets

(51) Int. Cl.
*H01M 10/02* (2006.01)
*H01M 10/04* (2006.01)
*B29C 65/74* (2006.01)
*H01M 4/04* (2006.01)
*B32B 41/00* (2006.01)
*B65H 23/038* (2006.01)

(52) U.S. Cl.
CPC ........... *B32B 41/00* (2013.01); *H01M 4/0435* (2013.01); *H01M 10/02* (2013.01); *H01M 10/04* (2013.01); *H01M 10/0404* (2013.01); *H01M 10/425* (2013.01); *B65H 23/038* (2013.01); *Y02E 60/10* (2013.01)

(58) Field of Classification Search
CPC .. H01M 10/02; H01M 10/04; H01M 10/0404; H01M 10/0585; H01M 10/425; B32B 37/0053; B32B 41/00; B32B 2041/04; B32B 2041/06; B32B 2309/08; B32B 2309/10; B32B 2309/105; B32B 2309/12; B32B 2457/18; B65H 23/038; Y02E 60/10

See application file for complete search history.

(56) References Cited

FOREIGN PATENT DOCUMENTS

| | | |
|---|---|---|
| JP | H10310297 A | 11/1998 |
| JP | 2007242507 A | 9/2007 |
| JP | 2012033282 A | 2/2012 |
| JP | 2012074402 A | 4/2012 |
| JP | 2016035915 A | 3/2016 |

OTHER PUBLICATIONS

Written Opinion of the International Searching Authority issued for PCT/JP2017/032340, dated Dec. 12, 2017.

\* cited by examiner

MANUFACTURING APPARATUS FOR ELECTRODE LAMINATE

CROSS REFERENCE TO RELATED APPLICATIONS

The present application is a continuation of International application No. PCT/JP2017/032340, filed Sep. 7, 2017, which claims priority to Japanese Patent Application No. 2016-247449, filed Dec. 21, 2016, the entire contents of each of which are incorporated herein by reference.

TECHNICAL FIELD

The present invention relates to a manufacturing apparatus for an electrode laminate having a structure in which an electrode is sandwiched between a first separator and a second separator.

BACKGROUND OF THE INVENTION

A battery is known including an electrode body having a structure in which a plurality of positive electrodes and a plurality of negative electrodes are alternately stacked with a separator interposed there between. An electrode body having such a structure is formed, for example, by alternately laminating a plurality of electrode laminates having a structure in which one of a positive electrode and a negative electrode is sandwiched between a first separator and a second separator, and the other ones of the positive and negative electrodes.

Japanese Patent Application Laid-Open No. 2012-74402 (Patent Document 1) describes a method for manufacturing such an electrode body in which positive and negative electrodes are alternately and repeatedly placed on an elongated separator along its longitudinal direction. A second elongated separator is further laminated on top of the electrodes and the first separator to form a laminated body and then the laminated body is folded in such a manner that the positive and negative electrodes alternately overlap with each other. In this manner an electrode body in which the positive electrode and the negative electrode are alternately laminated with the separator interposed there between is manufactured.

Japanese Patent Application Laid-Open No. 9-221252 (Patent Document 2) describes a technique, in which, when an elongated positive electrode sheet, an elongated separator, and an elongated negative electrode sheet are laminated together, an edge sensor detects a lateral positional displacement of the positive electrode sheet with respect to the separator and the negative electrode sheet that are previously laminated and the lateral positional displacement is corrected.

Figure 6:
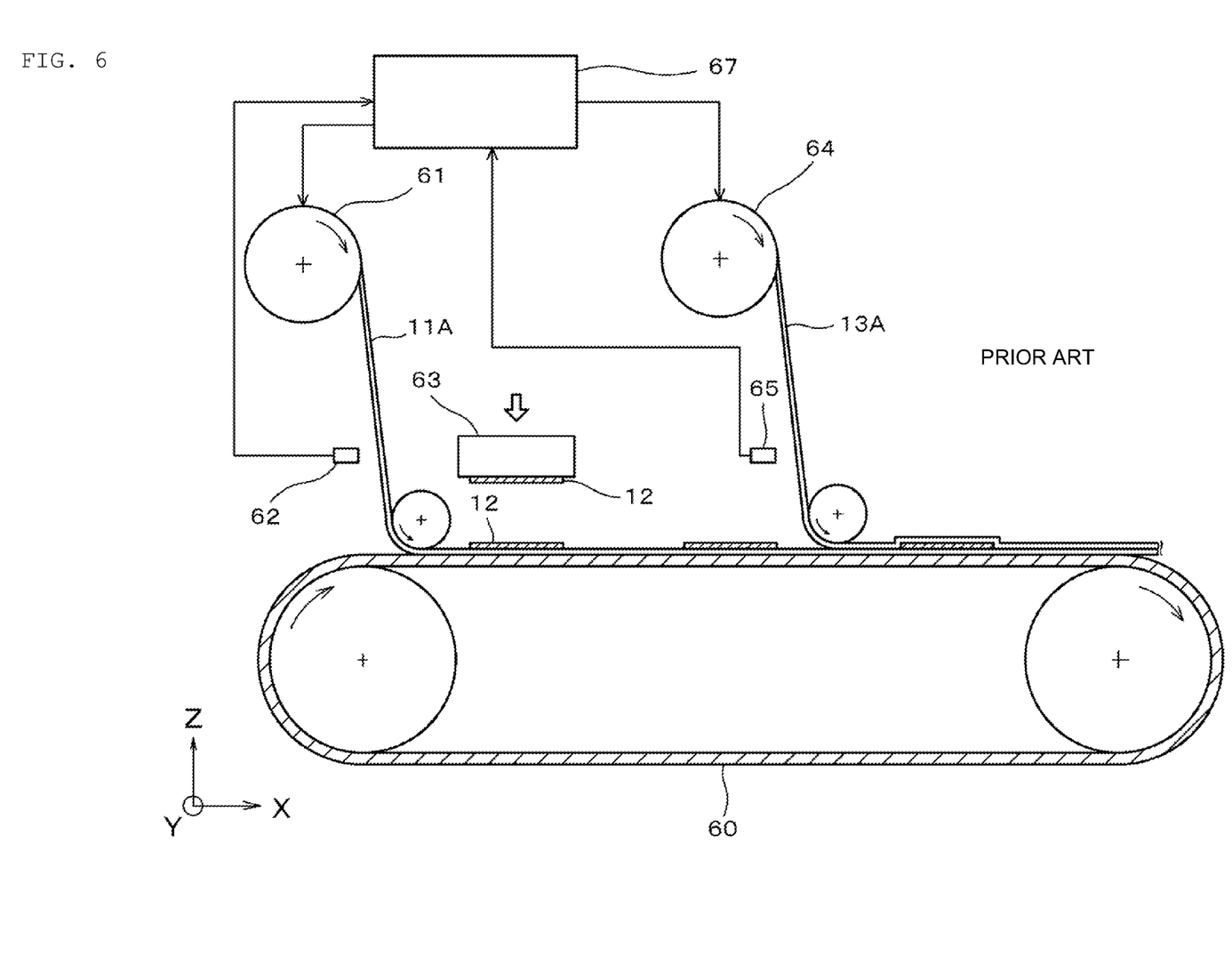
FIG. 6 is a side view showing a schematic configuration of an apparatus for manufacturing an electrode laminate, which can be considered from Patent Documents 1 and 2.

According to Patent Documents 1 and 2, as an apparatus for manufacturing an electrode laminate, a manufacturing apparatus having a configuration as shown in FIG. 6 is conceivable.

In the manufacturing apparatus shown in FIG. 6, a first separator material supply unit 61 supplies an elongated first separator material 11A (wound in a roll) onto a conveyor belt 60.

A first lateral positional displacement amount detection sensor 62 detects a lateral positional displacement amount of an edge in a width direction, which is a direction perpendicular to a longitudinal direction, of the first separator material 11A with respect to a predetermined reference position, at a position before a position where the first separator material 11A is supplied onto the conveyor belt 60. Here, the lateral positional displacement amount of the edge in the width direction of the first separator material with respect to the predetermined reference position is referred to as a first lateral positional displacement amount.

An electrode supply unit 63 supplies an electrode 12 to a predetermined electrode supply position. In this manner, the electrode 12 is supplied onto the first separator material 11A supplied onto the conveyor belt 60. The electrode 12 is one of a positive electrode and a negative electrode. Note that the electrode 12 is configured to be repeatedly supplied to the same position in a conveying direction of the conveyor belt 60 and in a direction orthogonal to the conveying direction.

A second separator material supply unit 64 supplies an elongated second separator material 13A to the first separator material 11A so as to sandwich the electrode 12 with the first separator material 11A.

A second lateral positional displacement amount detection sensor 65 detects a lateral positional displacement amount of an edge in a width direction of the second separator material 13A with respect to a predetermined reference position, at a position before the second separator material 13A is supplied onto the first separator material 11A. Here, the lateral positional displacement amount of the edge in the width direction of the second separator material 13A with respect to the predetermined reference position is referred to as a second lateral positional displacement amount.

The first separator material supply unit 61 and the second separator material supply unit 64 are configured to be movable in a Y-axis direction in FIG. 6, that is, a direction orthogonal to a direction (X-axis direction) in which the elongated first separator material 11A is conveyed on the conveyor belt 60, and the width direction of the first separator material 11A and the second separator material 13A. A control unit 67 moves the first separator material supply unit 61 in the Y-axis direction based on the first lateral positional displacement amount to correct a position of the edge in the width direction of the first separator material 11A supplied to the conveyor belt 60. Further, the control unit 67 moves the second separator material supply unit 64 in the Y-axis direction based on the second lateral positional displacement amount to correct a position of the edge in the width direction of the second separator material 13A supplied onto the conveyor belt 60.

After the above, the first separator material 11A and the second separator material 13A that are laminated are cut into a predetermined shape, so that an electrode laminate including the first separator, the electrode, and the second separator is formed.

With such a configuration, when an electrode laminate is formed using the elongated first separator material 11A, the electrode 12, and the elongated second separator material 13A, it is possible to suppress a lateral positional displacement between the first separator and the second separator, and the electrode sandwiched between the first separator and the second separator.

However, in the manufacturing apparatus shown in FIG. 6 described above, when an error occurs in the predetermined reference position used as a reference by the first lateral positional displacement amount detection sensor 62 and the second lateral positional displacement amount detection sensor 65, positions of edges of the first separator material 11A and the second separator material 13A are corrected based on the erroneous reference position. Therefore, in the electrode laminate produced, a lateral positional displacement occurs between the first separator and the second separator, and the electrode sandwiched between the first separator and the second separator.

The present invention has been made to solve the above problem, and it is an object of the present invention to provide a manufacturing apparatus for an electrode laminate, the manufacturing apparatus being capable of manufacturing an electrode laminate, in which a lateral positional displacement of an elongated separator material is suppressed, so that a lateral positional displacement between the separator and an electrode is suppressed.

BRIEF DESCRIPTION OF THE INVENTION

A manufacturing apparatus for an electrode laminate of the present invention has a structure in which an electrode is sandwiched between a first separator and a second separator. The manufacturing apparatus for an electrode laminate includes:

a conveyor belt configured to convey the elongated first separator material and the elongated second separator material in a direction along a longitudinal direction of the conveyor belt;

a first separator material supply unit configured to supply the first separator material onto the conveyor belt;

a first lateral positional displacement amount detection sensor configured to detect, as a first lateral positional displacement amount, a lateral positional displacement amount in a width direction that is a direction orthogonal to the longitudinal direction of the first separator material with respect to a predetermined reference position at a position before a position where the first separator material is supplied onto the conveyor belt;

a first lateral positional displacement correction unit configured to correct a position in the width direction of the first separator material supplied onto the conveyor belt based on the first lateral positional displacement amount;

an electrode supply unit configured to supply the electrode onto the first separator material supplied onto the conveyor belt by supplying the electrode to a predetermined electrode supply position;

a second separator material supply unit configured to supply the second separator material onto the first separator material so as to sandwich the electrode between the first separator material and the second separator material;

a second lateral positional displacement amount detection sensor configured to detect, as a second lateral positional displacement amount, a lateral positional displacement amount in the width direction of the second separator material with respect to the predetermined reference position at a position before a position where the second separator material is supplied onto the first separator material;

a second lateral positional displacement correction unit configured to correct a position in the width direction of the second separator material supplied onto the first separator material based on the second lateral positional displacement amount;

an image pickup unit configured to detect an actual lateral positional displacement amount in the width direction of the first separator material from a relationship with the position of the electrode by imaging the electrode supplied onto the first separator material and the first separator material;

a reference position correction unit configured to correct the predetermined reference position used as a reference by the first lateral positional displacement amount detection sensor and the second lateral positional displacement amount detection sensor based on the actual lateral positional displacement amount; and a cutting unit configured to cut the first separator material and second separator material having been laminated to obtain the electrode laminate.

The configuration may be such that, when the first lateral positional displacement amount is smaller than a predetermined threshold value, the first lateral positional displacement correction unit corrects a position of the first separator material on a single occasion so that the first lateral positional displacement amount becomes zero, and when the first lateral positional displacement amount is equal to or larger than the predetermined threshold value, the first lateral positional displacement correction unit corrects a position of the first separator material over a plurality of times so that the first lateral positional displacement amount becomes zero, and when the second lateral positional displacement amount is smaller than the predetermined threshold value, the second lateral positional displacement correction unit corrects a position of the second separator material on a single occasion so that the second lateral positional displacement amount becomes zero, and when the second lateral positional displacement amount is equal to or larger than the predetermined threshold value, the second lateral positional displacement correction unit corrects a position of the second separator material over a plurality of times so that the second lateral positional displacement amount becomes zero.

The configuration may be such that, in the first separator material supply unit, the elongated first separator material is wound in a roll, when the first lateral positional displacement amount is equal to or larger than the predetermined threshold value, the first lateral positional displacement correction unit corrects a position of the first separator material over the number of times that is a value obtained by dividing circumference of an outermost circumference of the first separator material wound in a roll by an electrode pitch which is an interval at which the electrode is supplied onto the first separator material, in the second separator material supply unit, the elongated second separator material is wound in a roll, and when the second lateral positional displacement amount is equal to or larger than the predetermined threshold value, the second lateral positional displacement correction unit corrects a position of the second separator material over the number of times that is a value obtained by dividing circumference of an outermost circumference of the second separator material wound in a roll by the electrode pitch.

The manufacturing apparatus for an electrode laminate may further include a calculation unit configured to calculate an average value of actual lateral positional displacement amounts obtained a predetermined number of times by the image pickup unit, and in the manufacturing apparatus, the reference position correction unit may correct the predetermined reference position based on the average value of the actual lateral positional displacement amounts.

According to the present invention, an actual lateral positional displacement amount in the width direction of the first separator material is detected from a relationship with a position of the electrode to be supplied to the predetermined electrode supply position, and, based on the detected actual lateral positional displacement amount, the predetermined reference position serving as a reference for detecting a lateral positional displacement between the first separator material and the second separator material is corrected. Accordingly, even in a case where an error occurs in a predetermined reference position used as a reference by the first lateral positional displacement amount detection sensor and the second lateral positional displacement amount detection sensor, the predetermined reference position can be corrected. In this manner, it is possible to manufacture an electrode laminate in which the lateral positional displacement between the separator and the electrode is suppressed by suppressing a lateral positional displacement between the elongated first separator material and the elongated second separator material.

MODE FOR CARRYING OUT THE INVENTION

Hereinafter, embodiments of the present invention will be shown to explain characteristics of the present invention more specifically.

First, a structure of an electrode laminate will be briefly described, and then a method for manufacturing an electrode laminate will be described.

Figure 1:
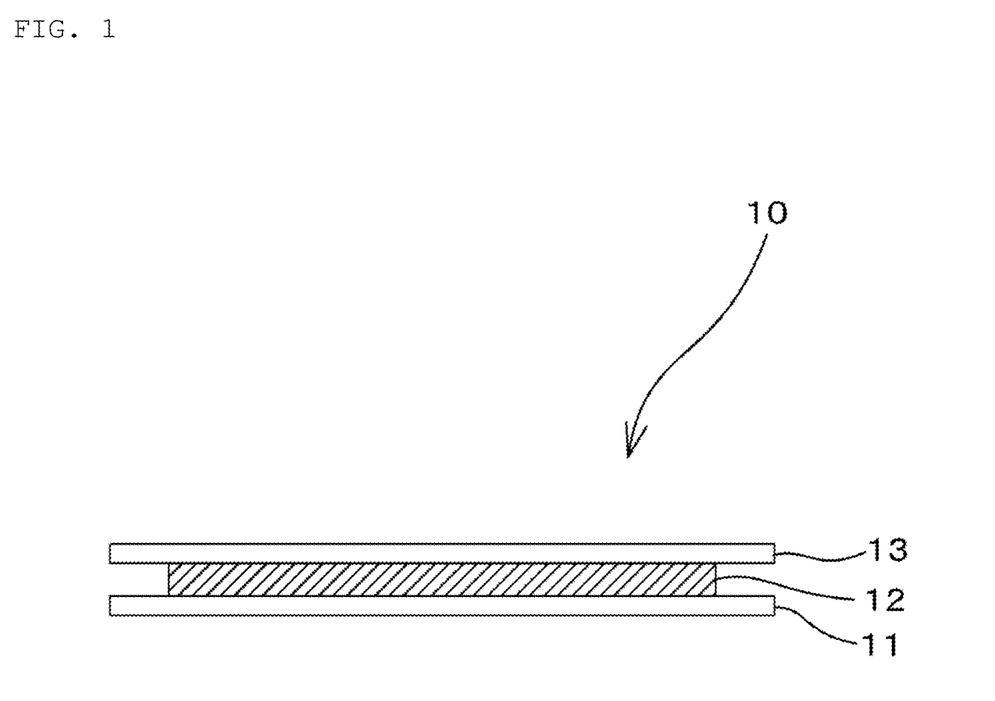
FIG. 1 is a cross-sectional view showing a structure of an electrode laminate.

As shown in FIG. 1, the electrode laminate 10 has a structure in which a first separator 11, an electrode 12, and a second separator 13 are laminated in together.

The electrode 12 is either a positive or a negative electrode. When it is a positive electrode, it preferably includes a positive electrode current collector made of a metal foil, such as aluminum, and a positive electrode active material formed on opposite sides of the positive electrode current collector. When the electrode 12 is a negative electrode, it preferably includes a negative electrode current collector made of a metal foil, such as copper, and a negative electrode active material formed on opposite sides of the negative electrode current collector. The shape of the electrode 12 may be rectangular or non-rectangular.

The first and second separators 11 can be made of the same material and, for example, can be constituted by a microporous thin film made of polypropylene having excellent insulation.

Figure 2:
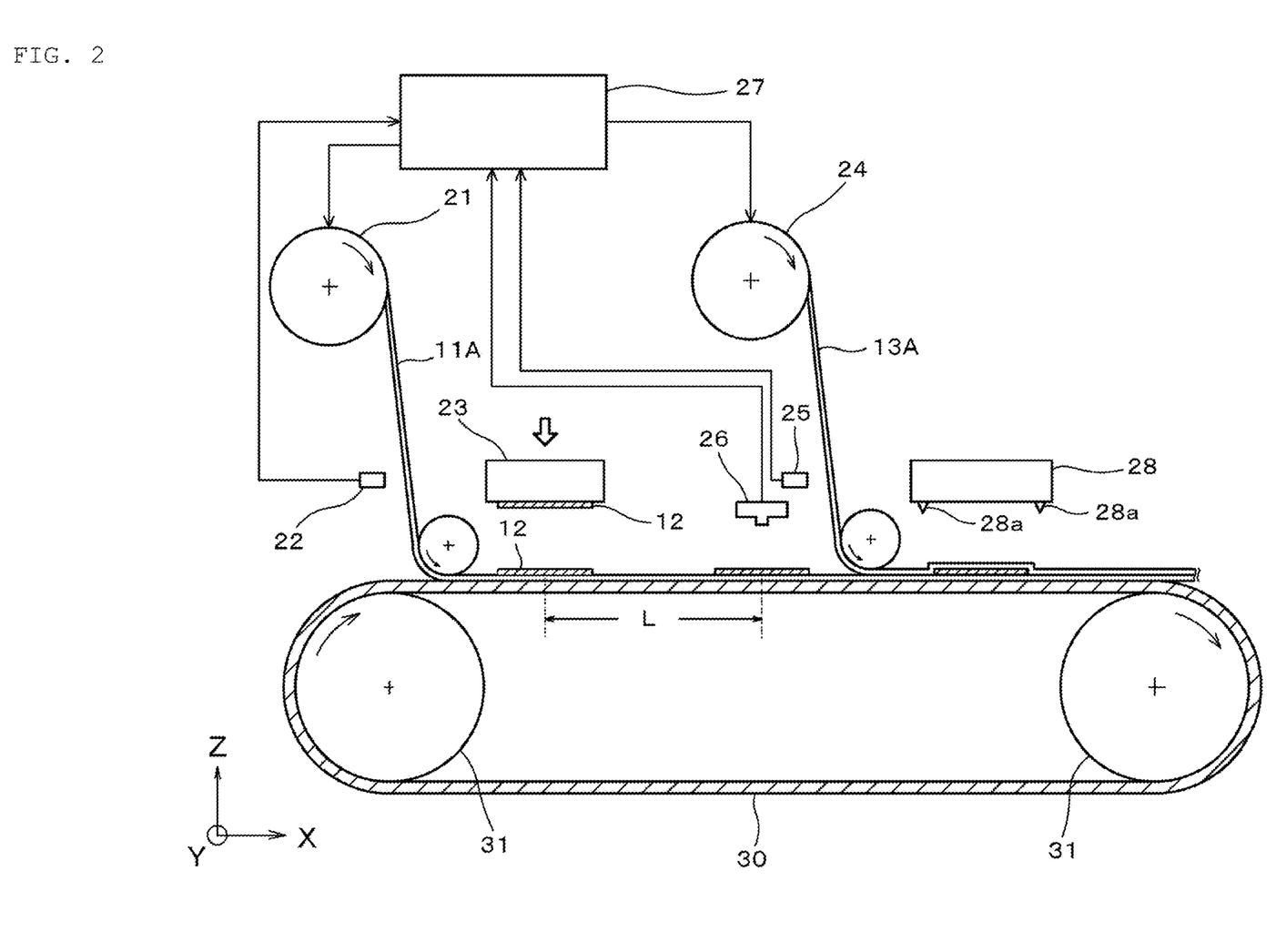
FIG. 2 is a side view showing a schematic configuration of a manufacturing apparatus for an electrode laminate according to an embodiment.
Figure 3:
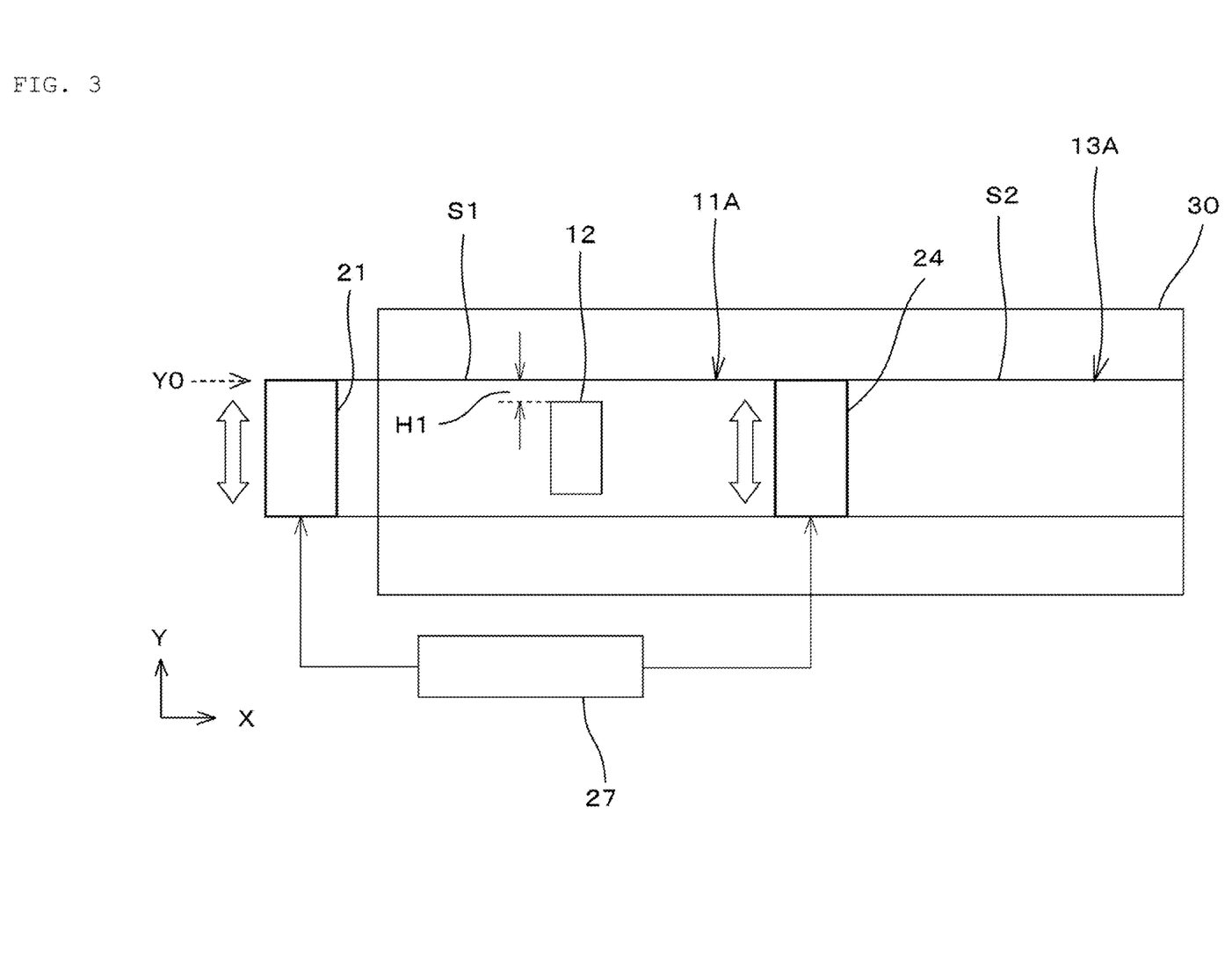
FIG. 3 is a plan view for explaining a method for correcting a position of an edge of a first separator material.

FIG. 2 is a side view showing a schematic configuration of an apparatus for manufacturing the electrode laminate 10 according to one embodiment of the invention. As best shown in FIG. 3, the goal is to place first and second elongated separator materials 11A and 13A one on top of the other with a series of electrodes 12 (only one of which is shown in FIG. 3) sandwiched there between. When doing so, it is important that the lateral location of the electrodes (i.e., in a direction along the Y-axis) be maintained at a predetermined location relative to the lateral edges of the first and second separator materials 11A and 13A. That is, in the example shown in FIG. 3, the upper edge of the electrode 12 should be spaced from the upper edge of the first separator material 11A by a predetermined distance H1 (as measured in the lateral or Y-axis direction). Similarly, it is important that the first and second separator materials 11A and 13A be placed on top of one another with a proper alignment in the lateral direction (in the preferred embodiment with the upper and lower edges of the two separator materials overlapping one another). In order to do so, the system must compensate for, inter alia, meandering of the conveyer belt 30 as it moves in its traveling direction (the X-direction as shown in FIG. 2).

In the present embodiment, a first separator material supply unit 21 supplies an elongated first separator material 11A (preferably wound in a roll) onto a conveyor belt 30 with the supply rate of the first separator material 11A being controlled to match (or at least approximate) the traveling speed of the conveyor belt 30 (i.e., the speed that the conveyer belt 30 moves in the X-axis direction, to the right as viewed in FIG. 3).

The conveyor belt 30 is made of, for example, metal, and conveys the elongated first separator material 11A and a second separator material 13A (described below) in a longitudinal traveling direction corresponding to the longitudinal direction of the separator materials (i.e., to the right as viewed in FIG. 2). The conveyer belt 30 is driven preferably by a drive roller 31.

The conveyor belt 30 has one or more suction holes (not shown) which pull the first separator material 11A supplied onto the conveyor belt 30 downward (as viewed in FIG. 2) onto the conveyer belt 30 and thereby hold the first separator material 11A on the belt 30. As described further below, when the second separator material 13A is supplied onto the first separator material 11A it is also sucked downward by the suction of the suction hole(s) through the first separator material 11A to be held on the first separator material 11A.

As the conveyor belt 30 moves in the longitudinal traveling direction, the lateral edges of the belt meander back and forth in the traverse direction (i.e., the Y-axis direction which is orthogonal to the longitudinal direction of the first separator material 11A) because, inter alia, the lateral edges are not parallel but are distorted. This creates a problem since the first separator material 11A needs to be placed at a predetermined lateral position on the conveyer belt. In order to compensate for this lateral movement of the conveyer belt 30, the present invention detects the position of the conveyer belt as it moves in its traveling direction and adjusts the lateral position at which the first separator material 11A is placed on the conveyer belt.

To this end, a first lateral positional displacement amount detection sensor 22 (e.g., a laser sensor) detects the lateral positional displacement of an edge of the conveyer belt 30 (relative to a predetermined reference position Y0 described below) as it passes a first point located upstream of the position where the first separator material 11A is placed on the conveyer belt 30. Hereinafter, this lateral positional displacement amount is referred to as a first lateral positional displacement amount.

As best shown in FIG. 3, the predetermined reference position Y0 is a reference position for determining a supply position at which the first separator material 11A is supplied onto the conveyor belt 30 so that the lateral position (Y-axis direction) of the electrodes 12 subsequently applied to the conveyer belt 30 is a predetermined position relative to the transverse position of the first separator material 11A (i.e., such that an intended positional relationship between the lateral position of the first separator material 11A and the electrode 12 is achieved). When there is no displacement in the predetermined reference position Y0 and the first separator material 11A does not meander in the width direction, a positional relationship between the first separator material 11A supplied to a position determined based on the reference position Y0 and the electrode 12 supplied onto the first separator material 11A can be an intended positional relationship.

A control unit 27 corrects the lateral position of, in the present embodiment, the upper edge of the first separator material 11A as it is supplied onto the conveyor belt 30 based on (as a function of) the first lateral positional displacement amount detected by the first lateral positional displacement amount detection sensor 22.

FIG. 3 is a plan view for explaining a method for correcting a position of an edge (in the example shown, the upper edge) of the first separator material 11A. The first separator material supply unit 21 is configured to be movable in the lateral (Y-axis) direction in FIG. 3 orthogonal to the traveling direction (X-axis direction) of the conveyor belt 30.

The control unit 27 functions as a first lateral positional displacement correction unit and drives the first separator material supply unit 21 in the plus or minus Y-axis direction to cause the first lateral positional displacement amount detected by the first lateral positional displacement amount detection sensor 22 to become zero. In this manner, the lateral position of an edge of the first separator material 11A is corrected. When the position of the edge of the first separator material 11A is corrected such that the first lateral positional displacement amount becomes zero, the position of the upper edges S1 of the first separator material 11A coincides with the predetermined reference position Y0 when it is supplied to the conveyer belt 30.

Referring again to FIG. 2, an electrode supply unit 23 supplies the electrode 12 to a predetermined electrode supply position on the first separator material 11A. The predetermined electrode supply position includes a predetermined lateral location relative to the reference position Y0. When there is no lateral positional displacement at the predetermined reference position Y0 and the first separator material 11A is supplied to a position based on the predetermined reference position Y0 without a displacement, the electrode 12 is supplied to a predetermined position on the first separator material 11A.

Specifically, as shown in FIG. 3, the electrode 12 is supplied onto the first separator material 11A at a position which is laterally offset from the predetermined reference position Y0 by a distance H1 as measured in the lateral (Y-axis) direction. In other words, a distance between the electrode 12 supplied onto the first separator material 11A and the predetermined reference position Y0 is H1. The distance H1 can be, for example, 2.5 mm.

Note that the electrode supply unit 23 supplies a plurality of electrodes 12 to the conveyer belt 30. The electrodes are supplied at a predetermined interval such that they are placed on the first separator material 11A with an electrode pitch L (FIG. 2) of, for example, 102 mm.

A second separator material supply unit 24 supplies the elongated second separator material 13A (preferably wound in a roll) onto the conveyor belt 30. More specifically, it is supplied onto the first separator material 11A in such a manner that the electrodes 12 are sandwiched between the second separator material 13A and the first separator material 11A. The supply rate of the second separator material 13A is controlled so that the second separator material 13A is appropriately supplied onto the conveyor belt 30 according to the traveling speed of the conveyor belt 30.

A second lateral positional displacement amount detection sensor 25, for example a laser sensor, detects a lateral positional displacement amount of, in the present embodiment, the upper edge of the second separator material 13A with respect to the predetermined reference position Y0 at a position upstream of the position at which the second separator material 13A is supplied onto the first separator material 11A. Hereinafter, the lateral positional displacement amount of the edge of the second separator material 13A is referred to as a second lateral positional displacement amount.

The control unit 27 corrects the lateral position of upper the edge of the second separator material 13A as it is supplied onto the conveyor belt 30 based on the second lateral positional displacement amount detected by the second lateral positional displacement amount detection sensor 25.

Like the first separator material supply unit 21, the second separator material supply unit 24 is also configured to be movable in the positive and negative Y-axis direction, that is, in a direction orthogonal to the traveling direction (X-axis direction) of the conveyor belt 30.

The control unit 27 also functions as a second lateral positional displacement correction unit which drives the second separator material supply unit 24 in the lateral direction in such a manner that the second lateral positional displacement amount detected by the second lateral positional displacement amount detection sensor 25 becomes zero (i.e., the upper edge of the second separator material 13A is located at the lateral position desired). In this manner, the lateral position of the edge of the second separator material 13A is corrected. When the position of the edge of the second separator material 13A is corrected such that the second lateral positional displacement amount becomes zero, a position of the upper edge S2 of the second separator material 13A as it is supplied onto the conveyor belt 30 coincides with the predetermined reference position Y0 in the Y-axis direction.

A camera 26 is located between the position at which the electrode 12 is placed on the conveyor belt 30 and the position at which the second separator 13A is applied to the first separator 11A. The camera 26 captures an image of a region where a lateral positional relationship between the electrode 12 placed on the first separator material 11A and the first separator material 11A can be confirmed, and detects an actual lateral positional displacement amount of the first separator material 11A relative to the electrode 12. The actual lateral positional displacement amount is detected each time a new electrode 12 is supplied onto the first separator material 11A.

As described above, in a case where there is no lateral positional displacement between the first separator material 11A and the electrode 12, a distance between the electrode 12 and the upper edge S1 of the first separator material 11A is H1 (see FIG. 3). Therefore, if the distance between upper edge of the electrode 12 and the upper edge S1 of the first separator material 11A detected from an image captured by the camera 26 is H2, the actual lateral positional displacement amount is H2-H1. For example, when H1 is 2.5 mm and H2 is 3.5 mm, the actual lateral positional displacement amount is 1.0 mm.

One reason that a lateral positional displacement of the first separator material 13A supplied onto the conveyor belt 30 occurs even though the position of the edge of the first separator material 11A had been already corrected based on the first lateral positional displacement amount is that an error occurs in the predetermined reference position used as a reference by the first lateral positional displacement amount detection sensor 22.

That is, if, for some reason, an error occurs in the predetermined reference position Y0 used as a reference by the first lateral positional displacement amount detection sensor 22, a lateral positional displacement is corrected based on the erroneous reference position. Accordingly, a lateral positional displacement occurs between the upper edge S1 of the first separator material 11A supplied onto the conveyor belt 30 and the predetermined reference position Y0, which causes a lateral positional displacement to occur between the first separator material 11A and the electrode 12. Further, since the predetermined reference position Y0 is also used as a reference by the second lateral positional displacement amount detection sensor 25, a lateral positional displacement also occurs between the second separator material 13A and the electrode 12.

Here, when a lateral positional displacement occurs between the first and second separator materials 11A and 13A, the first separator material 11A and the second separator material 13A are supplied to a lateral position that is shifted from a position of the suction hole(s) (not shown) provided on the conveyor belt 30, and the first separator material 11A and the second separator material 13A cannot always be stably conveyed while being drawn down by the suction from the suction hole(s). Further, the second separator material 13A needs to be held and conveyed by the conveyor belt 30 by a suction force from the suction hole(s) via the first separator material 11A. However, when a lateral positional displacement occurs, the electrode 12 may interrupt the suction, and the second separator material 13A may be unable to be conveyed stably while being sucked.

Therefore, in the manufacturing apparatus for the electrode laminate 10 according to the present embodiment, an actual lateral positional displacement amount in the width direction of the first separator material 11A is obtained based on a lateral positional relationship between the electrode 12 that is supplied to a predetermined electrode supply position and the first separator material 11A, and, based on the obtained actual lateral positional displacement amount, the predetermined reference position Y0 used as a reference for detecting a lateral positional displacement amount by the first lateral positional displacement amount detection sensor 22 and the second lateral positional displacement amount detection sensor 25 is corrected. This suppresses a lateral positional displacement of the elongated first and second separator materials 11A and 13A, and the electrode laminate 10 in which a lateral positional displacement between the first separator 11, the electrode 12, and the second separator 13 is suppressed can be manufactured.

Further, by suppressing the lateral positional displacement of the first and second separator materials 11A and 13A, they can be stably conveyed while being held on the conveyor belt 30 by a suction force from the suction hole(s) (not shown) provided on the conveyor belt 30.

For this reason, the control unit 27 functioning as a reference position correction unit corrects the predetermined reference position Y0 based on an actual lateral positional displacement amount of the first separator material 11A detected by the image pickup unit 26.

In this embodiment, an average value k1 of actual lateral positional displacement amounts detected a predetermined number of times by the camera 26 is calculated, and the predetermined reference position Y0 is corrected based on the calculated average value k1 of the lateral positional displacement amounts. The predetermined number of times is, for example, 40 times. The average value k1 of the actual lateral positional displacement amounts is calculated by the control unit 27.

Figure 4:
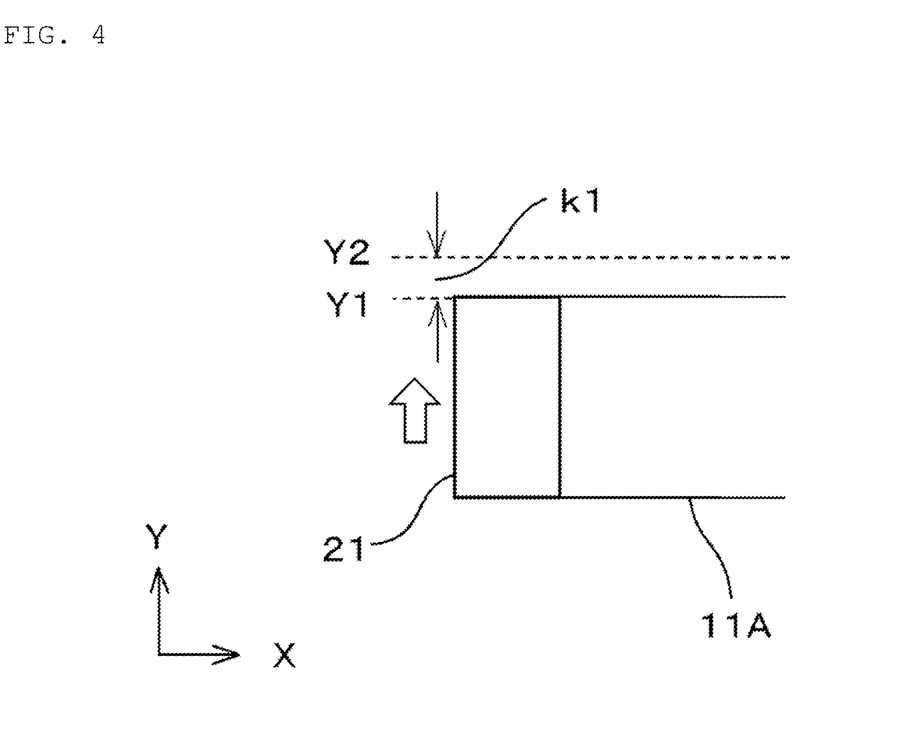
FIG. 4 is a plan view for explaining a predetermined reference position before correction and a predetermined reference position after correction.

The control unit 27 sets, as the corrected predetermined reference position Y0, a position shifted from the current predetermined reference position Y0 in the Y-axis direction by a distance of the average value k1 of the actual lateral positional displacement amount. For example, as shown in FIG. 4, when a position coordinate in the Y-axis direction before correction of the predetermined reference position Y0 is Y1 and a position coordinate in the Y-axis direction after the correction of the predetermined reference position Y0 is Y2, Y2=Y1+k1 is established.

According to the method for calculating the average value k1 of actual lateral positional displacement amounts obtained the predetermined number of times and correcting the predetermined reference position Y0 based on the calculated average value k1 of the lateral positional displacement amounts, a processing load can be reduced as compared with a method in which the predetermined reference position Y0 is corrected for each electrode pitch L based on a detected actual lateral positional displacement amount.

The first lateral positional displacement amount detection sensor 22 detects the first lateral positional displacement amount of the upper edge of the first separator material 11A based on the corrected predetermined reference position Y0. The control unit 27 corrects the position of the edge in the width direction of the first separator material 11A based on the detected first lateral positional displacement amount.

Further, the second lateral positional displacement amount detection sensor 25 detects the second lateral positional displacement amount of the edge of the second separator material 13A based on the corrected predetermined reference position Y0. The control unit 27 corrects the position of the edge in the width direction of the second separator material 13A based on the detected second lateral positional displacement amount.

In the present embodiment, when correcting the position of the edge of the first separator material 11A based on the first lateral positional displacement amount, the control unit 27 preferably calculates a correction method based on the magnitude of the first lateral positional displacement amount. That is, the first lateral positional displacement amount is compared with a predetermined threshold Th, and when the first lateral positional displacement amount is smaller than the predetermined threshold Th, the position of the edge of the first separator material 11A is corrected on a single occasion. When the first lateral positional displacement amount is equal to or larger than the predetermined threshold Th, the position of the edge of the first separator material 11A is corrected a plurality of times with a correction amount smaller than the first lateral positional displacement amount. The predetermined threshold Th is, for example, 0.3 mm.

Further, when correcting the position of the edge of the second separator material 13A based on the second lateral positional displacement amount, the control unit 27 changes a correction method based on the magnitude of the second lateral positional displacement amount. That is, the second lateral positional displacement amount is compared with the predetermined threshold Th, and when the second lateral positional displacement amount is smaller than the predetermined threshold Th, the position of the edge of the second separator material 13A is corrected on a single occasion. When the second lateral positional displacement amount is equal to or larger than the predetermined threshold Th, the position of the edge of the second separator material 13A is corrected a plurality of times with a correction amount smaller than the second lateral positional displacement amount.

When the position of the edge of the first separator material 11A is corrected on a single occasion, the first separator material supply unit 21 is moved in the Y-axis direction so that the first lateral positional displacement amount becomes zero. In this case, a correction amount when the position of the edge of the first separator material 11A is moved is equal to the first lateral positional displacement amount.

Similarly, when the position of the edge of the second separator material 13A is corrected on a single occasion, the second separator material supply unit 24 is moved in the Y-axis direction so that the second lateral positional displacement amount becomes 0. Also in this case, the correction amount when the position of the edge of the second separator material 13A is moved is equal to the second lateral positional displacement amount.

Next, a method for correcting the position of the edge of the first separator material 11A over a plurality of times will be described. Note that, although the explanation is omitted, the above applies similarly to a method for correcting the position of the edge of the second separator material 13A over a plurality of times.

In the present embodiment, the circumference of an outermost circumference of the first separator material 11A wound in a roll is divided by the electrode pitch L. In this manner, the number of corrections for making the first lateral positional displacement amount zero is calculated. The circumference of an outermost circumference of the first separator material 11A wound in a roll is detected by a circumference detection sensor (not shown).

For example, when the circumference of an outermost circumference of the first separator material 11A is 408 mm and the electrode pitch L is 102 mm, the number of corrections is 4 (=408/102) times.

In this case, a correction amount per single occasion is a value obtained by dividing the first lateral positional displacement amount by the number of corrections. For example, when the first lateral positional displacement amount is 1 mm and the number of corrections is four, a correction amount per single occasion is 0.25 (=¼) mm.

Note that the method for setting the number of corrections and the correction amount per single occasion is not limited to the above-described method.

The control unit 27 corrects the position of the edge of the first separator material 11A by moving the first separator material supply unit 21 in the Y-axis direction by the correction amount per single occasion. By carrying out this correction for each electrode pitch L for the number of times of correction, the first lateral positional displacement amount is set to zero while the first separator material 11A in a roll is unwound by one turn. In a case where the first lateral positional displacement amount is 1 mm and the number of corrections is four, correction of moving the first separator material supply unit 21 by 0.25 mm in the Y-axis direction at each electrode pitch L is performed four times, so that the lateral positional displacement of 1 mm is corrected.

As described above, when the first lateral positional displacement amount and the second lateral positional displacement amount are equal to or larger than the predetermined threshold Th, the positions of the edges of the first separator material 11A and the second separator material 13A are corrected little by little over a plurality of times. In this manner, it is possible to suppress the occurrence of what is called overshoot, in which the position of the edge after correction exceeds a desired position.

Further, when the first lateral positional displacement amount and the second lateral positional displacement amount are smaller than the predetermined threshold Th, the positions of the edges of the first separator material 11A and the second separator material 13A are corrected on a single occasion. In this manner, a lateral positional displacement can be quickly corrected.

In order to form the electrode laminate 10, a cutting unit 28 cuts the first separator material 11A and the second separator material 13A with a cutting blade 28a so as to cut a predetermined region including the electrode 12. In this manner, the electrode laminate 10 including the first separator 11, the electrode 12, and the second separator 13 is obtained. Note that the first separator material 11A, the electrode 12, and the second separator material 13A that are laminated may be adhered by a thermocompression bonding method that performs pressurization while heating, before cutting is performed by the cutting unit 28.

Figure 5:
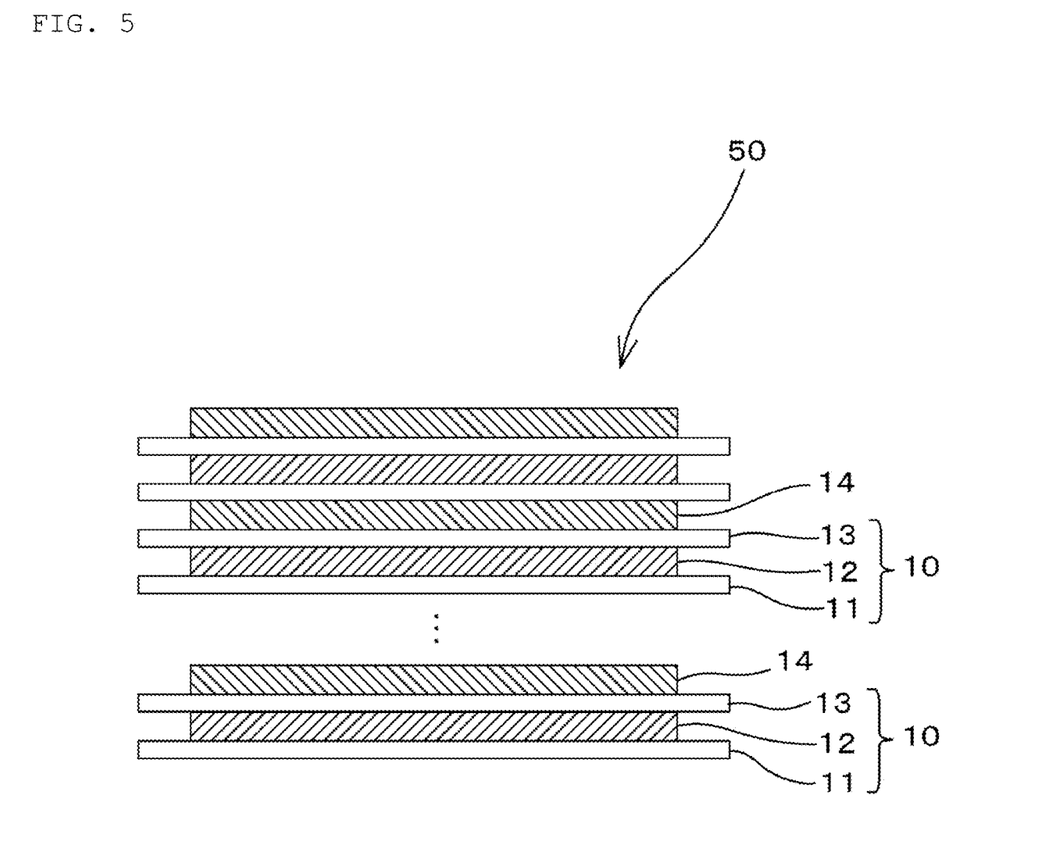
FIG. 5 is a cross-sectional view showing a structure of an electrode body formed by using an electrode laminate.

The produced electrode laminate 10 is used for creating an electrode body of a battery. That is, an electrode body 50 as shown in FIG. 5 is created by alternately laminating the produced electrode laminate 10 and a second electrode 14 different in polarity from the electrode 12. The electrode body 50 is used for manufacturing a battery, such as a lithium ion battery, for example.

The present invention is not limited to the above embodiment, and various applications and variations can be added within the scope of the present invention.

For example, in the above-described embodiment, an average value of actual lateral positional displacement amounts obtained for a predetermined number of times detected by the camera 26 is calculated, and the predetermined reference position is corrected based on the calculated average value of the lateral positional displacement amounts. However, the predetermined reference position may be corrected based on an actual lateral positional displacement amount detected by the camera 26 for each electrode pitch L.

Further, in the above-described embodiment, the first lateral positional displacement amount and the second lateral positional displacement amount are compared with the predetermined threshold Th, and, in accordance with a result of the comparison, a method for correcting the first lateral positional displacement amount and the second lateral positional displacement amount is changed. However, without the comparison with the predetermined threshold Th, positions of the edges of the first separator material 11A and the second separator material 13A may be corrected on a single occasion in such a manner that the first lateral positional displacement amount and the second lateral positional displacement amount become zero.

The first lateral positional displacement amount detection sensor 22 is described to detect the first lateral positional displacement amount of the first separator material 11A based on the position of the edge of the first separator material 11A. However, the first lateral positional displacement amount may be detected with reference to the predetermined position of the first separator material 11A. Similarly, the second lateral positional displacement amount detection sensor 25 may detect the second lateral positional displacement amount with reference to the predetermined position of the second separator material 13A.

DESCRIPTION OF REFERENCE SYMBOLS

10: electrode laminate
11: first separator

11A: first separator material
12: electrode
13: second separator
13A: second separator material
14: second electrode
21: first separator material supply unit
22: first lateral positional displacement amount detection sensor
23: electrode supply unit
24: second separator material supply unit
25: second lateral positional displacement amount detection sensor
26: camera (image pickup unit)
27: control unit
28: cutting unit
30: conveyor belt
50: electrode body

The invention claimed is:

1. An apparatus for manufacturing an electrode laminate in which an electrode is sandwiched between first and second separators, the manufacturing apparatus comprising:
    an elongated conveyor belt configured to move in a traveling direction and having a lateral dimension measured perpendicular to the traveling direction, the conveyer belt being configured to convey elongated first and second separator materials in the traveling direction;
    a first separator material supply source configured to supply the first separator material onto the conveyor belt at a first location;
    a first sensor configured to detect, as a first lateral positional displacement amount, the lateral displacement of the first separator material relative to a predetermined lateral reference position at a position upstream of the first location;
    a first lateral positional displacement correction unit configured to correct the lateral position of the first separator material as it is supplied onto the conveyor belt based on the first lateral positional displacement amount;
    an electrode supplier configured to supply the electrode onto the first separator material at a predetermined electrode supply position located downstream of the positon where the first separator is applied to the conveyor belt;
    a second separator material supply unit configured to supply the second separator material onto the first separator material so as to sandwich the electrode between the first and second separator materials;
    a second sensor configured to detect, as a second lateral positional displacement amount, a lateral positional displacement amount of the second separator material with respect to the predetermined reference position at a position upstream of a position where the second separator material is supplied onto the first separator material;
    a second lateral positional displacement correction unit configured to correct a lateral position of the second separator material supplied onto the first separator material based on the second lateral positional displacement amount;
    an image detector configured to detect an actual lateral positional displacement amount of the first separator material from a lateral relationship with the position of between the electrode and the first separator material by imaging the electrode supplied onto the first separator material and the first separator material;
    a reference position correction unit configured to correct the predetermined reference position used as a reference by the first and second sensors based on the actual lateral positional displacement amount; and
    a cutter configured to cut the first and second separator materials after they have been laminated to around the electrode to obtain the electrode laminate.

2. The apparatus according to claim 1, wherein:
    when the first lateral positional displacement amount is smaller than a predetermined threshold value, the first lateral positional displacement correction unit corrects a position of the first separator material on a single occasion so that the first lateral positional displacement amount becomes zero, and when the first lateral positional displacement amount is equal to or larger than the predetermined threshold value, the first lateral positional displacement correction unit corrects a position of the first separator material over a plurality of times so that the first lateral positional displacement amount becomes zero, and
    when the second lateral positional displacement amount is smaller than the predetermined threshold value, the second lateral positional displacement correction unit corrects a position of the second separator material on a single occasion so that the second lateral positional displacement amount becomes zero, and when the second lateral positional displacement amount is equal to or larger than the predetermined threshold value, the second lateral positional displacement correction unit corrects a position of the second separator material over a plurality of times so that the second lateral positional displacement amount becomes zero.

3. The manufacturing apparatus for an electrode laminate according to claim 2, wherein:
    in the first separator material supply unit, the first separator material is elongated and is wound in a roll;
    when the first lateral positional displacement amount is equal to or larger than the predetermined threshold value, the first lateral positional displacement correction unit corrects a position of the first separator material over the number of times that is a value obtained by dividing circumference of an outermost circumference of the first separator material wound in a roll by an electrode pitch which is an interval at which the electrode is supplied onto the first separator material;
    in the second separator material supply unit, the second separator material is elongated and is wound in a roll; and
    when the second lateral positional displacement amount is equal to or larger than the predetermined threshold value, the second lateral positional displacement correction unit corrects a position of the second separator material over the number of times that is a value obtained by dividing circumference of an outermost circumference of the second separator material wound in a roll by the electrode pitch.

4. The manufacturing apparatus for an electrode laminate according to claim 1, further comprising a calculation unit configured to calculate an average value of actual lateral positional displacement amounts obtained a predetermined number of times by the image pickup unit, wherein the reference position correction unit corrects the predetermined reference position based on the average value of the actual lateral positional displacement amounts.

* * * * *